Sept. 25, 1945.　　　　D. L. HILL　　　　2,385,441
IMPLEMENT FOR SOIL PREPARATION
Filed Feb. 11, 1944

DUDLEY L. HILL
INVENTOR

BY John P. Nilonow
ATTORNEY

UNITED STATES PATENT OFFICE 2,385,441

IMPLEMENT FOR SOIL PREPARATION

Dudley L. Hill, Peekskill, N. Y.

Application February 11, 1944, Serial No. 521,925

7 Claims. (Cl. 97—60)

My invention relates to implements for soil preparation and has particular reference to gardening implements used for the preparation of soil prior to planting of seeds or seedlings.

My invention has for its object to provide an implement which can be used to prepare the soil within a limited area by breaking up lumps and hard or caked portions into a more or less finely crushed and comminuted material, thereby admitting air to the soil for oxidizing organic matter and, also, for breaking up roots of weeds and grass.

Another object of my invention is to provide an implement which can be used to dig a hole of desired depth and diameter for one or a few plants, to prepare the soil removed from the hole by crushing and breaking up the soil particles, and to refill the hole with the prepared soil.

I have found that the best results can be obtained by providing an implement having a tubular portion which can be inserted into the ground to the desired depth, isolating a cylindrical plug of the soil, which can then be crushed and ground by a device or devices in the tubular portion, which can be manually operated for this purpose. The crushed and partly removed soil can be again placed into the hole within the tubular portion upon completion of the grinding operation. The implement can be then withdrawn for preparation of the next hole.

My invention is more fully described in the accompanying specification and drawing in which.

Figure 1:
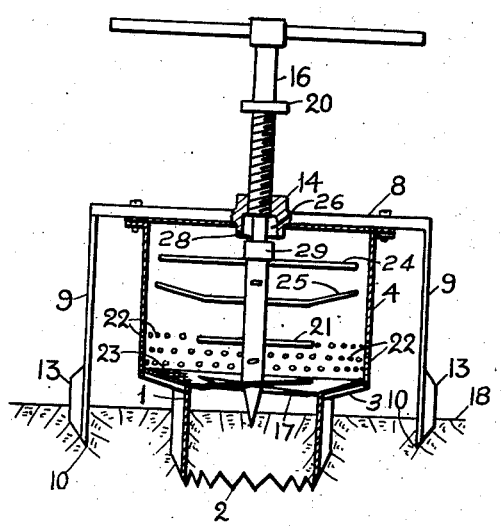
Fig. 1 is a sectional elevation of my implement.
Figure 2:
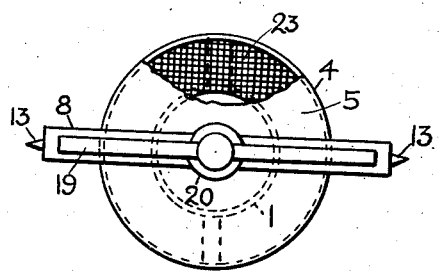
Fig. 2 is a top plan view of the same partly in section.

My implement as shown in Figs. 1 and 2 consists of a tubular member 1 of a diameter corresponding to the diameter of a hole which it is desired to make in the ground for planting. The lower end of the tubular member is provided with a sharp edge and/or teeth 2 to facilitate insertion of the tubular member into the ground. The tubular member is connected at the top by a spider 3 with the lower end of an upper or outer tubular member 4 which may be closed at the top by a lid 5. A bar 8 is attached to a flange at the upper end of the tube 4 as by screws or bolts 6 and is provided with legs 9 having sharp points 10 for insertion into the ground, the bars with the legs forming a yoke. The legs serve to stabilize the tubular members when placed in an operative position and to prevent rotary movement of the tubes. For this purpose the lower tube 1 and the legs 9 may be provided with sharp ribs 12 and 13 respectively.

The cross bar 8 is provided in the middle with a threaded nut 14 for a threaded shaft 16. An auger 17 is mounted on the lower end of the shaft. The auger may be of any suitable shape and is shown formed with two inclined cutting blades, preferably having the same pitch as the threads on the shaft. The shaft has handles 19 at the upper end of its rotation.

The operation of my implement is as follows:

The device is placed on the ground 18, where it is desired to prepare the soil, and is pressed downward, until the lower tube 1 is inserted to a sufficient depth. To facilitate the insertion, the operator's foot may be placed on the bar 8 in the same manner as is used for pressing a shovel into the ground. The implement is steadied during this operation by holding the handles 19. The shaft is then rotated by the handles in direction for moving the shaft downward in the threads and for screwing the auger into the soil. A collar 20 on the shaft limits the downward movement of the auger.

The crushed soil is raised from the hole, made by the auger, into the larger upper tube 3. It is additionally crushed by blades 21 on the shaft 16, the blades being of a sufficient length to rotate inside the tube 1.

The crushed soil is partly sieved back to the outside of the tubes through perforations 22 in the lower portions of the walls of the upper tube 4. For the same purpose the spider 3 is covered by a screen 23.

The soil, when cut by the auger and further crushed by the knives, occupies a much greater volume than when packed tightly in the ground, and its excess overflows into the outer tube 4. Here the soil is further crushed and broken up by long blades 24 extending from the shaft 16 to the inner walls of the tube 4 from which they are separated by a suitable clearance.

To facilitate removal of the crushed soil from the upper tube, the spider 3 and the screen 23 may be made inclined or tapered as shown. The lowest long blades 25 may be provided with correspondingly inclined outer ends for scraping the soil off the screen 23 when the auger is in its lowest position and prevented from further downward movement by the collar 14. Threads may be removed at 26 under the collar 20 so that the shaft can be given several turns for crushing the soil and scraping it off the screen 23.

Upon completion of the downward movement, the auger is raised and rotated backwards, partly for raising the soil by the auger and for admitting the crushed soil, and partly for allowing the crushed soil to flow back into the hole made by the auger. The blades continue their crushing operation during the upward movement of the auger.

The auger may be moved two or three times up and down if desired for a more thorough crushing and comminuting of the soil. Provision is also made for allowing continuous rotation of the shaft 14 in its upper position, for which purpose the thread is removed from the shaft at 27 for a distance, somewhat larger than the height of the nut 14 so that the shaft in its upper position is entirely disengaged from the nut 14. A bearing 28 is provided under the nut 14 for an enlarged portion 29 of the shaft for guiding the shaft when it is rotated in its uppermost position.

Figure 3:
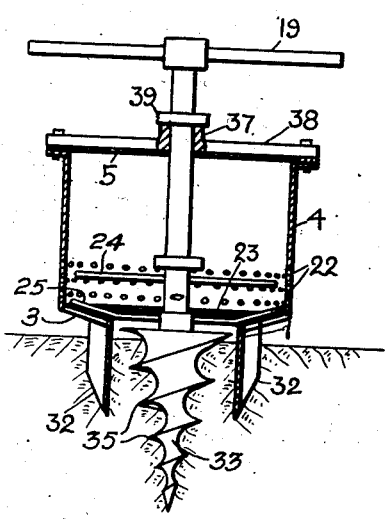
Fig. 3 is a sectional elevational view of a modified implement.
Figure 4:
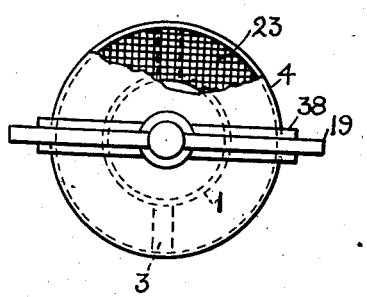
Fig. 4 is a top plan view of the modified implement partly in section.

A modified implement is shown in Figs. 3 and 4. The legs 9 of Fig. 1 are omitted and relatively wide ribs 32 are provided at the sides of the lower tube 1 for preventing its rotation when the auger is rotated. The auger 33 is made in the form of an inverted cone with a spiral cutting edge 35, specially adapted for crushing the soil and raising it into the upper tube 4. The auger is mounted at the lower end of a shaft 36 which in this case may be smooth, without the threads of the shaft 16 of Fig. 1. The shaft is journaled in a bearing 37 in a cross-bar 38 attached to the flange of the tube 4 by screws or bolts 6. Collars 39, 40 limit the vertical movements of the shaft.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. An implement for soil preparation comprising a tubular member adapted to be inserted into the ground; an elongated member supported at the top of the tubular member; a shaft rotatively supported in the tubular member; handles at the upper end of the shaft; an auger at the lower end of the shaft, the shaft having a threaded connection with the elongated member for causing the shaft to move axially when rotated; and radial blades on the shaft above the auger for churning the soil raised by the auger, the shaft having a smooth portion at the lower end of the threaded portion for permitting rotation of the shaft in its upper position without the corresponding axial movement.

2. An implement for soil preparation comprising a tubular member having a lower and an upper cylindrical portion, the lower portion being adapted to be inserted into the ground, the upper portion being of a relatively larger diameter; a shaft rotatively supported at the top of the upper portion adapted to be manually rotated; an auger at the lower end of the shaft of a diameter smaller than the diameter of the lower portion; and radial blades on the shaft in the enlarged portion for churning the soil raised by the auger, the tubular member having perforations for sieving the raised soil to the outside.

3. An implement for soil preparation comprising a tubular member having a lower and an upper cylindrical portion, the lower portion being adapted to be inserted into the ground, the upper portion being of a relatively larger diameter; a perforated annular plate connecting the top of the lower portion with the bottom of the upper portion; an elongated member supported at the top of the upper portion; a manually operable shaft rotatively supported in the elongated member concentrically with the tubular member an auger at the lower end of the shaft adapted to raise the soil into the upper portion; and radial blades on the shaft in the upper portion adapted to scrape the surface of the perforated plate.

4. An implement for soil preparation comprising a tubular member adapted to be inserted in the ground; a manually operable shaft rotatively supported in the tubular member; an auger at the lower end of the shaft; means on the shaft for causing the auger to move in vertical direction when manually rotated; and means on the shaft for comminuting the soil raised by the auger into the tubular member.

5. An implement for soil preparation comprising a tubular member adapted to be inserted into the ground; an elongated member supported at the top of the tubular member; a shaft rotatively supported in the elongated member; handles at the upper end of the shaft; an auger at the lower end of the shaft; the shaft having a threaded connection with the elongated member for causing the shaft to move axially when rotated; and means to prevent the axial movement when the shaft is rotated in a fully raised position.

6. An implement for soil preparation comprising a tubular member adapted to be inserted into the ground; a bracket attached to the upper end of the tubular member having legs extending downward at the sides of the cylindrical member and adapted to be inserted into the ground; a shaft rotatively supported in the bracket adapted to be manually rotated; an auger at the lower end of the shaft in the tubular member; blades on the shaft above the auger in the tubular member; and means on the shaft cooperating with the bracket for causing the shaft to move axially in one or the other direction depending on the direction of rotation of the shaft.

7. An implement for soil preparation comprising a tubular member having a lower and an upper cylindrical portion, the lower portion being adapted to be inserted into the ground, the upper portion being of a relatively larger diameter; a perforated annular plate connecting the top of the lower portion with the bottom of the upper portion; a shaft rotatively supported at the top of the upper portion adapted to be manually rotated; an auger at the lower end of the shaft of a diameter smaller than the diameter of the lower portion; and radial blades on the shaft in the upper portion for churning the soil raised by the auger, the upper tubular member having perforations for sieving the soil raised by the auger to the outside thereof.

DUDLEY L. HILL.